United States Patent
Yoshioka

(10) Patent No.: US 7,552,167 B2
(45) Date of Patent: Jun. 23, 2009

(54) COMMUNICATIONS CONTROL METHOD AND SYSTEM WITH AUTOMATIC DATA CONGESTION PREVENTING FUNCTION

(75) Inventor: Shin-ichi Yoshioka, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 367 days.

(21) Appl. No.: 10/133,502

(22) Filed: Apr. 29, 2002

(65) Prior Publication Data
US 2003/0135546 A1 Jul. 17, 2003

(30) Foreign Application Priority Data
Dec. 19, 2001 (JP) ............... 2001-386024

(51) Int. Cl.
*G06F 13/00* (2006.01)
(52) U.S. Cl. ............... 709/203
(58) Field of Classification Search ......... 709/206, 709/207, 223, 225, 203; 713/202; 718/108; 719/313; 725/13; 370/229, 401; 714/6
See application file for complete search history.

(56) References Cited

U.S. PATENT DOCUMENTS

| | | | | |
|---|---|---|---|---|
| 6,026,167 A * | 2/2000 | Aziz | .................. | 380/28 |
| 6,134,582 A * | 10/2000 | Kennedy | .................. | 709/206 |
| 6,247,065 B1 * | 6/2001 | Greenspan et al. | .......... | 719/313 |
| 6,301,604 B1 * | 10/2001 | Nojima | .................. | 718/108 |
| 6,324,650 B1 * | 11/2001 | Ogilvie | .................. | 713/202 |
| 6,341,309 B1 * | 1/2002 | Vaid et al. | .................. | 709/223 |
| 6,359,882 B1 * | 3/2002 | Robles et al. | .................. | 370/389 |
| 6,411,606 B1 * | 6/2002 | Moura et al. | .................. | 370/282 |
| 6,473,425 B1 | 10/2002 | Bellaton et al. | | |
| 6,493,347 B2 * | 12/2002 | Sindhu et al. | .................. | 370/401 |
| 6,546,416 B1 * | 4/2003 | Kirsch | .................. | 709/206 |
| 6,628,609 B2 * | 9/2003 | Chapman et al. | .................. | 370/229 |
| 6,700,871 B1 * | 3/2004 | Harper et al. | .................. | 370/235 |
| 6,704,772 B1 * | 3/2004 | Ahmed et al. | .................. | 709/207 |
| 6,862,264 B1 * | 3/2005 | Moura et al. | .................. | 370/229 |
| 6,985,454 B1 * | 1/2006 | Wiedeman et al. | .................. | 370/316 |
| 7,065,573 B2 * | 6/2006 | Byrnes | .................. | 709/224 |
| 7,200,116 B2 * | 4/2007 | Kobayashi | .................. | 370/237 |
| 2001/0034882 A1 * | 10/2001 | Yuzawa | .................. | 725/13 |
| 2002/0138618 A1 * | 9/2002 | Szabo | .................. | 709/225 |

(Continued)

FOREIGN PATENT DOCUMENTS

JP 3-89747 4/1991

(Continued)

OTHER PUBLICATIONS

"Nikkei Communications", Apr. 5, 1999, pp. 160-165.

(Continued)

*Primary Examiner*—Robert B Harrell
(74) *Attorney, Agent, or Firm*—Staas & Halsey LLP

(57) ABSTRACT

A communications control method is provided for managing a communications system that includes an external network such as the Internet, an internal network and a router. A plurality of clients are connectable to the external network, while a server is connected to the internal network. The external network and the internal network are connected to each other via the router. In accordance with the communication control method, data sent from the client toward the server is stored in a suitable memory. Then, it is determined whether the stored data meets the prescribed delete condition. When this condition is met, the data is deleted from the memory.

15 Claims, 3 Drawing Sheets

U.S. PATENT DOCUMENTS

2006/0031927 A1 * 2/2006 Mizuno et al. .............. 726/11

FOREIGN PATENT DOCUMENTS

| JP | 09107376 A * | 4/1997 |
|---|---|---|
| JP | 10-200581 | 7/1998 |
| JP | 10-271154 | 10/1998 |
| JP | 11-234339 | 8/1999 |
| JP | 2000-207331 | 7/2000 |

OTHER PUBLICATIONS

"Nikkei Communications", Dec. 1, 1997, pp. 164-169.
Japanese Patent Office Action, mailed Nov. 27, 2007 and issued in corresponding Japanese Patent Application No. 2001-386024.

* cited by examiner

COMMUNICATIONS CONTROL METHOD AND SYSTEM WITH AUTOMATIC DATA CONGESTION PREVENTING FUNCTION

BACKGROUND OF THE INVENTION

1. Field of the Invention

The present invention relates to a communications system that utilizes networks and operates based on Internet Protocol. Further, the present invention relates to a method of controlling the communications system, and to a computer program used for managing the communications system.

2. Description of the Related Art

Networks based on Internet Protocol ('IP') have been used for a data communications system involving clients and servers connected to each other. Through the networks, each client can obtain various kinds of information. For instance, the client can view home pages and send or receive messages by E-mail. Upon receiving a request from the client, the server automatically sends back desired information to the client.

In the communications system, data congestion may occur when many clients try to access one particular server simultaneously. If such access concentration occurs, the supply of information to the client from the server may delay, and the quality of service by the server will deteriorate. What is worse, the amount of data to be process can be beyond the server's capacity, thereby breaking down the whole system.

Once the system stops functioning properly, the clients, who have no effective countermeasures against it, cannot help waiting for the system to return to the normal state. On the side of the server, to restore the system, the requests supplied from the clients may partially or entirely discarded, so that the amount of the work to be done is reduced below the server's capacity. Apparently, such destruction of the clients' data is not preferable.

One way to overcoming the data congestion or access concentration is to increase the data transfer rate on the networks, or to improve the data-processing capacity of the server However, the improvement of the data transfer rate or server's capacity is not a feasible option since it will lead to an increase in facility costs and therefore are not feasible options.

JP-A-10(1998)-200581 discloses a technique of avoiding IP packet congestion. Specifically, according to this conventional technique, a plurality of routers disposed between different networks are adjusted so that their data-receiving rate is reduced. This makes the data transfer scarcer, and therefore contributes to the prevention of IP packet congestion.

The above conventional technique, however, cannot prevent access concentration on a router or server. What is worse, once the access concentration occurs at a particular router for example, the network apparatuses adjacent (in a network-topological sense) to the router will be affected by the access concentration. For instance, the data-processing speed of the adjacent network apparatus can become unacceptably slower.

SUMMARY OF THE INVENTION

The present invention has been proposed under the circumstances described above. It is, therefore, an object of the present invention to provide a communications system whereby access concentration on a particular server and data congestion on the networks are eliminated. The present invention also relates to a computer program used for managing such a communications system.

According to a first aspect of the present invention, there is provided a communications control method for a communications system that includes: an external network connected to a client; an internal network connected to a server; and a router connecting the external network and the internal network to each other. The method includes the steps of: storing data sent from the client toward the server; determining whether the stored data meets a delete condition; and deleting the stored data when the delete condition is met.

Preferably, the method may further include the steps of: searching pieces of data sent from the client toward the server; determining whether said pieces of data contain identical messages; and deleting a redundant message when identical messages are found.

Preferably, the data deletion may be performed when an amount of data on the internal network is greater than a prescribed threshold.

Preferably, the data deletion may be performed when the stored data contains no sender address.

The method of the present invention may further include the steps of: sending response data from the server toward the client; and detecting a data transfer rate on the external network. The response data is thinned out when the data transfer rate is reduced.

According to a second aspect of the present invention, there is provided a communications system that includes: an external network connected to a client; an internal network connected to a server; a router connecting the external network and the internal network to each other; and a processor connected to the router for storing data sent from the client toward the server. The processor deletes the stored data when the stored data meets a predetermined delete condition.

Preferably, the processor may store several pieces of data sent from the client toward the server. In this case, when a redundant message is found among the stored pieces of data, the processor deletes the redundant message.

Preferably, the system of the present invention may further include a router controller that determines whether an amount of data on the internal network is greater than a prescribed threshold. When the above-mentioned amount of data is greater than the predetermined threshold, the data deletion is performed by the processor. The processor may delete anonymous data that contains no sender address.

Preferably, the system of the present invention may further include a router controller for detecting a data transfer rate on the external network. When the data transfer rate is reduced, response data sent from the server toward the client is thinned out.

According to a third aspect of the present invention, there is provided a computer program for a communications system that includes: an external network connected to a client; an internal network connected to a server; a router connecting the external network and the internal network to each other; and a processor connected to the router. The computer program executes the steps of: causing the processor to store data sent from the client toward the server; and causing the processor to delete the stored data when the stored data meets a delete condition.

Preferably, the program may further execute the step of determining whether the stored data contains a redundant message. A redundant message if any is deleted by the processor.

Preferably, the program may further execute the step of determining whether an amount of data on the internal network is greater than a prescribed threshold. When the above-mentioned amount of data is greater than the threshold, the data meeting the delete condition is deleted by the processor.

Preferably, in accordance with the program of the present invention, anonymous data containing no sender address is deleted by the processor.

Preferably, the program of the present invention may further execute the steps of: detecting a data transfer rate on the external network; and thinning out, when the data transfer rate is reduced, response data sent form the server toward the client.

According to the present invention, redundant or improper messages (including data, instructions, requirement, texts, etc.) are deleted from the data sent from the client toward the server. This prevents the data increase on the networks, thereby ensuring a smooth data transfer operation. As a result, the access concentration on a server and data congestion on a network are advantageously suppressed, so that the client can obtain a quick response from the server.

Other features and advantages of the invention of the present application will become more apparent from the following description of preferred embodiments of the invention.

DETAILED DESCRIPTION OF THE PREFERRED EMBODIMENT

The preferred embodiment of the present invention will be described below with reference to the accompanying drawings.

Figure 1:
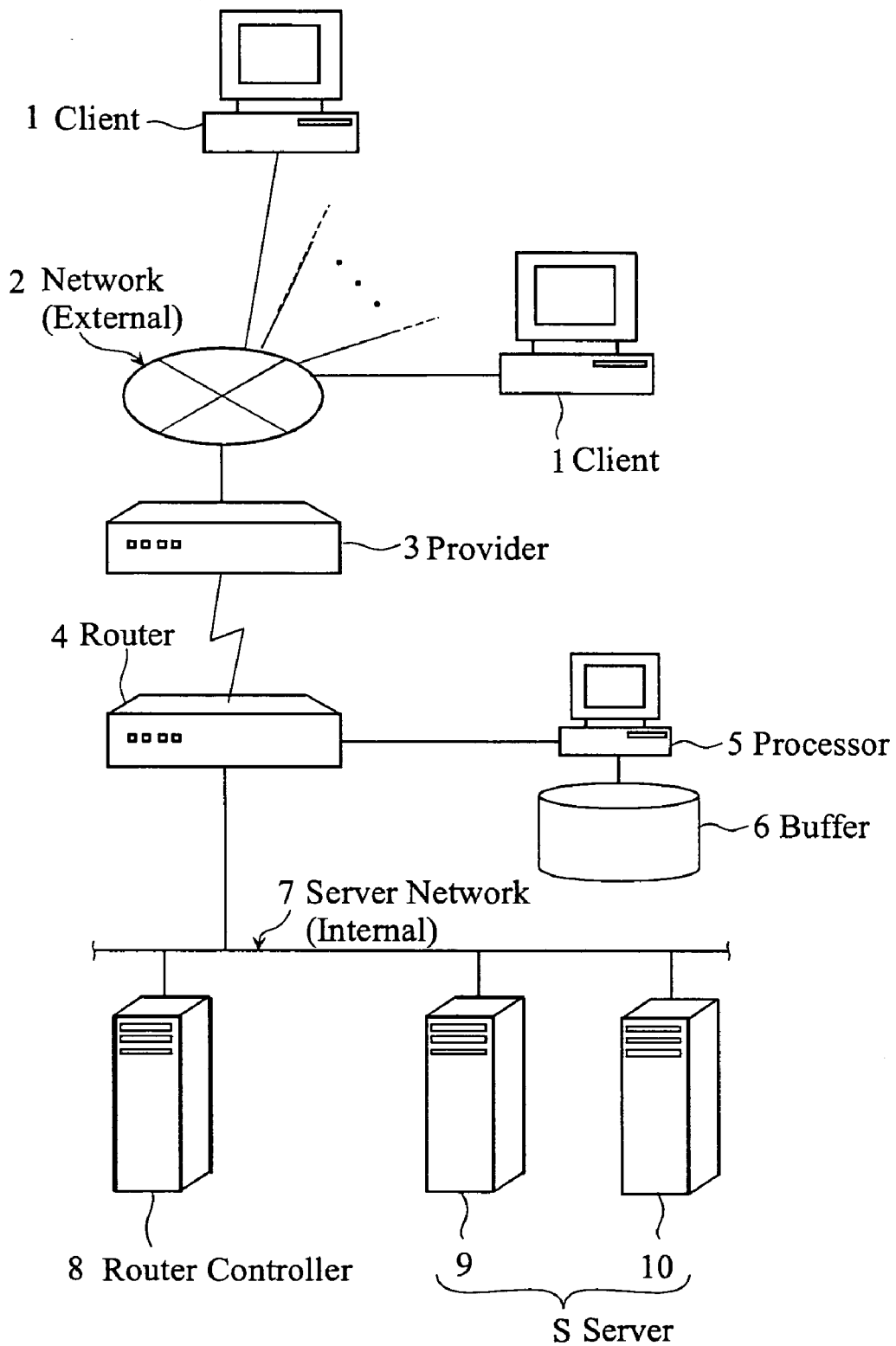
FIG. 1 shows the basic structure of a communications system according to the present invention.

FIG. 1 illustrates the basic concept of a communications system according to the present invention. The system includes a plurality of clients 1, an external network 2 (such as the Internet) to which the clients 1 are connectable, a provider apparatus 3 connected to the network 2, a router (or 'server node gateway') 4 connected to the apparatus 3, a processor 5 connected to the router 4 and provided with a buffer pool 6, an internal server network 7 connected to the router 4, a router controller 8 connected to the server network 7 for controlling the router 4, and servers S connected to the server network 7. In the illustrated example, the servers S include a WWW server 9 and an application server 10, though the present invention is not limited to this configuration. For instance, a file server, a mail server, a print server may be connected to the server network 7.

The clients 1 may be personal computers installed in work places or homes. The clients 1, as operated by the users, can access the servers S for viewing homepages or sending messages electronically (E-mail) for example.

The provider apparatus 3 is provided for connecting the clients 1 to the servers S via the relevant networks. The provider apparatus 3 is operated and managed by a communications service agency called 'provider'.

The router 4 connects the provider apparatus 3 to the server network (or inner network) 7. The IP addresses of the respective servers S are assigned to the router 4. The router 4 is responsible for controlling the data transfer between the clients 1 and the servers S.

The processor 5 is typically a personal computer and connected to the buffer pool 6 which may be a mass storage device incorporating a hard disk. As will be described in detail later, the processor 5, based on the instruction from the router controller 8, causes the data sent from the clients 1 to be temporarily stored in the buffer pool 6. The processor 5 also deletes unnecessary data stored in the buffer pool 6.

The router controller 8, connected to the server network 7, controls the router 4, the processor 5 and the servers S. The router controller 8 monitors both the condition of data congestion on the server network 7 and the data-processing load on the WWW server 9. Further, the router controller 8 supplies instructions to the processor 5 for causing the processor 5 to output data stored in the buffer pool 6 to the server network 7.

The WWW server 9, connected to the server network 7, provides various kinds of services to the clients 1. The WWW server 9 is provided with a microcomputer and a memory (both not shown) for storing homepage data.

The application server 10, connected to the server network 7, provides various kinds of services to the clients 1. The application server 10 is provided with a microcomputer and a memory (both not shown) for storing application software data.

Figure 2:
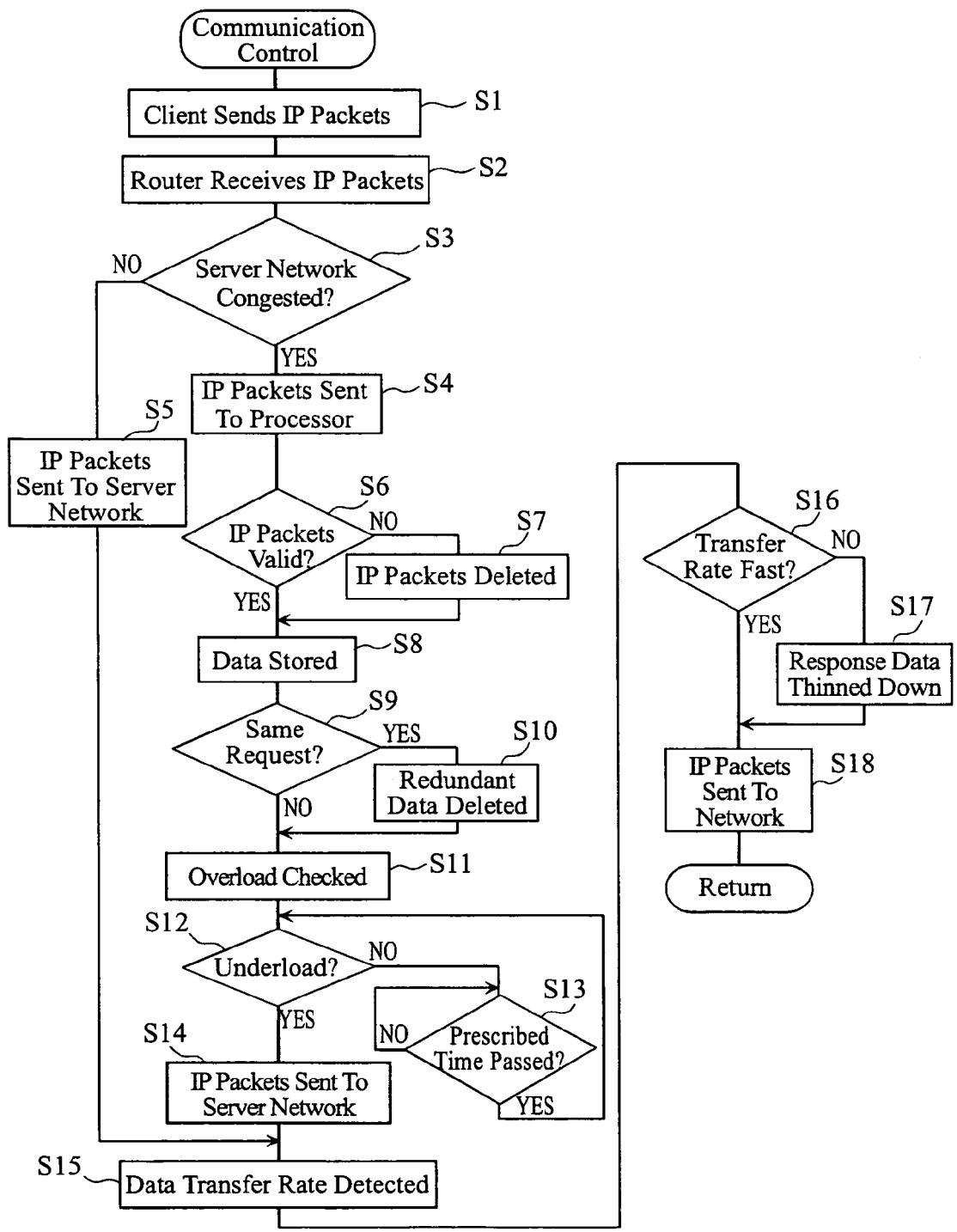
FIG. 2 is a flow chart illustrating the basic operations performed by the communications system of FIG. 1.
Figure 3:
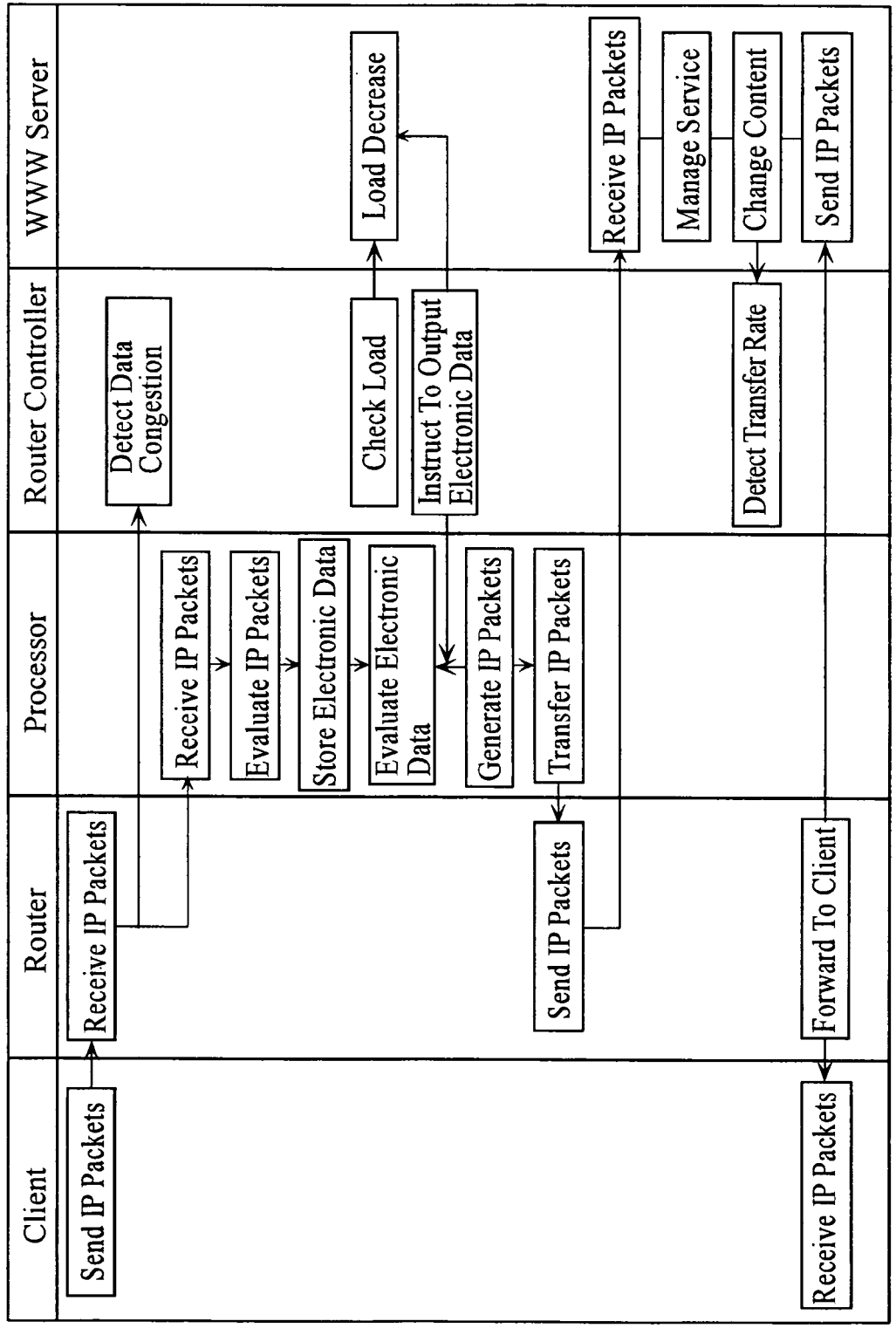
FIG. 3 is a diagram showing the data flow and the data-processing operations for the communications system of FIG. 1.

Referring now to FIGS. 2 and 3, the operation of the above communications system will be described below.

As an example, a user operates his or her personal computer (a client 1) in an attempt to access the WWW server 9. As properly operated, the client 1 produces electronic data for specifying the location of the desired homepage, a command for downloading the homepage, and so on. These data and command (inclusively called "client-originating data" hereinafter) are converted into IP packets and sent out to the external network 2 (S1). The IP packets are then sent to the router 4 via the provider apparatus 3. The router 4 receives the IP packets (S2) and stores them in its buffer (not shown).

While recognizing the router's reception of the IP packets, the router controller 8 determines whether data congestion is likely to occur on the server network 7 (S3). Specifically, the router controller 8 monitors the data transfer rate of the IP packets on the server network 7. When the transfer rate is below the prescribed value or likely to be below it, the router controller 8 determines that data congestion will occur.

When determining that data congestion will occur on the server network 7 (S3:YES), the router controller 8 instructs the router 4 to send the IP packets to the processor 5.

Upon receiving the instructions from the router controller 8, the router 4 transfers the IP packets stored in its buffer to the processor 5 (S4). According to the present invention, the arrangements may be made so that the IP packets from the external network 2 are sent to the processor 5 directly, that is, without being stored in the buffer of the router 4.

At Step 3, when the router controller 8 determines that no data congestion will occur on the server network 7 (S3:NO), the controller 8 instructs the router 4 to send the IP packets to the WWW server 9. Upon receiving such instructions, the router 4 sends the IP packets stored in its buffer to the WWW server 9 (S5).

The processor 5 checks the validity of the IP packets sent from the router 4 at Step 4. Specifically, the processor 5 determines whether the IP packets contain the complete IP address of the sender (S6). When the processor 5 finds that the sender address is missing or incomplete (S6:NO), the IP packets are deleted (S7).

The reason why an IP packet having no proper IP address of the sender should be deleted is as follows. When someone ties to obstruct the data communication service by sending invalid data, the obstructer will want to keep his deed anonymous so as to evade any possible punishment for example.

Therefore, when an IP packet is found to lack a proper IP address, it is most likely to come from an ill-intentioned person. Thus, the processor can delete such unidentified data without causing any disadvantage on the side of the data receiver.

In the above example, data is to be deleted when it lacks an sender address. Alternatively, the data deletion may be carried out when some other information is missing in the data.

At Step 6, when the processor 5 determines that the IP address of the sender is valid (S6:YES), the processor 5 reconverts the client-originating data from the IP packets sent from the router 4. The reconverted data is stored in the buffer pool 6 (S8). At this stage, the IP address of the sender, the IP address of the receiver, the protocol information (necessary for conversion into the IP packet), etc., are also stored in the buffer pool 6.

Thereafter, the processor 5 deletes redundant messages from the client-originating data. Specifically, the processor 5 searches the buffer pool 6 to find if it contains identical messages (requests, instructions, etc.) issued from the same client 1 (S9). When two or more identical messages are found to come from the same client 1, the processor 5 saves only one of them but deletes all the other ones (S10).

The data redundancy may result from the following situation. When access concentration occurs on the external network 2 or the server network 7, the response from the WWW server 9 becomes slower. Then, as becoming irritated by the slow response from the server 9, the user of a client 1 tends to issue the same instruction twice or more. These identical instructions themselves are valid data since they have the correct IP address of the sender. However, in a sense that they have the same content, they are redundant data for the WWW server 9 and the particular client 1. Such redundancy can worsen the data-congested situation caused by access concentration.

In accordance with the above-described embodiment of the present invention, the redundant pieces of data from the same sender are deleted by the processor 5. Thus, the data-processing work that the WWW server 9 should perform may be reduced by 50% or more. In this way, the time taken by the server 9 to perform the data-processing can be shorter despite the access concentration. Specifically, in the conventional system, the data-processing time tends to be ten times longer at the time of access concentration than in a normal situation. In the above embodiment, the data-processing can be performed much faster.

In accordance with the present invention, the data sent from the client 1 is temporarily stored in the buffer pool 6 (before it is forwarded to the WWW server 9) and redundant data, if any, is deleted from the buffer pool 6. Accordingly, the WWW server 9 will not be flooded with a lot of work to do beyond the server's capacity. Further, data transfer can be performed smoothly on the server network 7 without suffering data congestion.

In the conventional system, once a lot of access concentrates on the WWW server 9, the adverse effect can spread over the other networks. In the above preferred embodiment of the present invention, the data transfer will proceed smoothly, since the client's access requirement is managed by the router 4 and the processor 5 before it is sent to the server 9. Thus, impermissible access concentration or data congestion will not occur on the server network 7 nor the other networks.

At Step 11, the router controller 8 checks for an overload on the server network 7 and the WWW server 9. When the router controller 8 finds that there is no overload (S12:YES), it instructs the processor 5 to send the undeleted portion of the client-originating data to the WWW server 9. When the router controller 8 finds that there is an overload (S12:NO), the controller will perform another overload checking with respect to the server network 7 and the WWW server 9 in a prescribed period of time (S13:YES).

In accordance with the instruction from the router controller 8, the processor 5 retrieves the undeleted pieces of data from the buffer pool 6 one after another. The data retrieval may be performed in a forward order (first-in, first-out) or in a reverse order (last-in, first-out). The retrieved data is converted into IP packets and then sent to the buffer of the router 4.

Thereafter, the router 4 forwards the received data (IP packets) to the WWW server 9 via the server network 7 (S14).

The WWW server 9 performs required data-processing operation based on the received IP packets, and then sends an appropriate response to the relevant client 1. Alternatively, the server 9 may cooperate with the application server 10 to carry out the received instruction. In this case, upon receiving the IP packets from the router 4, the server 9 may send an instruction to the application server 10 for causing the server 10 to perform a certain job. After this job is done by the server 10, the result is sent to the WWW server 9. In accordance with the received result, the WWW server 9 may send appropriate data (response) to the client 1.

In accordance with the present invention, the response supplied to the client 1 from the server 9 is partially omitted in a certain situation, as described below.

Specifically, based on the information supplied from the provider apparatus 3, the router controller 8 detects the data transfer rate on the external network 2 (S15). Then, the controller 8 determines whether the transfer rate exceeds a prescribed threshold (S16). When the transfer rate is below the threshold (S16:NO), the router controller 8 instructs the WWW server 9 to reduce the amount of data to be sent to the client 1.

Upon receiving the cutdown instruction from the controller 8, the WWW server 9 thins down the contents of the data to be sent to the client 1 (S17). For example, when the contents include auxiliary information such as graphic data, the WWW server 9 deletes the auxiliary information and outputs the remaining pieces of data to the network 7 (S18) in the form of IP packets.

When the detected transfer rate is equal to or greater than the threshold (S16:YES), the server 9 sends the whole IP-packet data to the network 7 without thinning the data.

Alternatively, in accordance with the present invention, the data-thinning operation may be performed after the complete data is outputted to the network 7. In this case, the whole data outputted from the WWW server 9 may be temporarily stored in the buffer pool 6, and then subjected to the partial data deletion based on the instruction from the router controller 8.

With the above scheme, the content of the response data can be lightened. This is advantageous to reducing the load exerting on the networks.

As readily understood, the above-described various operations in the communications system can be realized by a computer program.

Specifically, a computer program may be designed to execute the step of causing the processor to store data sent from the client toward the server, and the step of causing the processor to delete the stored data when the stored data meets a delete condition.

Further, the program may be designed to execute a step of determining whether the stored data contains a redundant message. When the redundant message is found among the stored data, it will be deleted by the processor.

Further, the program may be designed to execute the step of determining whether an amount of data on the internal network is greater than a prescribed threshold. When the data on the internal network is found greater than the threshold, the data meeting the delete condition will be deleted by the processor The program may be designed to cause the processor to delete anonymous data containing no sender address.

Further, the program may be designed to execute the step of detecting a data transfer rate on the external network, and the step of thinning out response data sent form the server toward the client. It should be noted that this thinning-out step is performed when the data transfer rate is reduced, thereby hindering smooth data transfer on the external network.

The present invention is not limited to the above-described embodiment. For instance, the router 4, the processor 5 and the buffer pool 6 may be integrated into a single unit.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

The invention claimed is:

1. A communications control method for a communications system including: an external network connected to a client; a server network connected to a server; a router connecting the external network and the server network to each other; a processor connected to the router for receiving data from the router and for storing the data in a storage buffer; and a router controller connected to the server network and the router; the method comprising:
causing the router controller to check whether data congestion is likely to occur in the server network;
causing the router controller to instruct transmission of the data from the client to the server network via the external network and the router when the router controller determines that data congestion is not likely to occur in the server network;
causing the processor to store, in the storage buffer, the data sent from the client via the external network and the router before transmitting the data to the server network, when the router controller determines that data congestion is likely to occur in the server network;
causing the processor to determine whether a portion of the stored data meets a delete condition;
causing the processor to delete said portion of the stored data from the storage buffer when the delete condition is met; and
causing the processor to transmit a non-deleted portion of the stored data to the server network via the same router as used for transmitting the data from the client to the server network when the router controller determines that data congestion is not likely to occur in the server network.

2. The method according to claim 1, further comprising:
searching pieces of data sent from the client toward the server network;
determining whether said pieces of data contain identical messages; and
deleting a redundant message while retaining another message identical to the redundant message when identical messages are found.

3. The method according to claim 1, wherein the data deletion is performed when an amount of data on the server network is greater than a prescribed threshold.

4. The method according to claim 1, wherein the data deletion is performed when the stored data contains no sender address.

5. The method according to claim 1, further comprising: sending response data from the server toward the client; and detecting a data transfer rate on the external network; wherein the response data is thinned out when the data transfer rate is reduced.

6. A communications system comprising:
an external network connected to a client;
a server network connected to a server;
a router connecting the external network and the server network to each other;
a processor connected to the router for receiving data from the router and for storing the data in a storage buffer; and
a router controller connected to the server network and the router, wherein:
the router controller checks whether data congestion is likely to occur in the server network;
the router controller instructs transmission of the data from the client to the server network via the external network and the router when the router controller determines that data congestion is not likely to occur in the server network;
the processor causes the storage buffer to store the data sent from the client via the external network and the router before transmitting the data to the server network when the router controller determines that data congestion is likely to occur in the server network; and
the processor deletes a portion of the stored data from the storage buffer when the stored data meets a delete condition, the processor transmitting a non-deleted portion of the stored data to the server network via the same router as used for transmitting the data from the client to the server network when the router controller determines that data congestion is not likely to occur in the server network.

7. The system according to claim 6, wherein the processor stores pieces of data sent from the client toward the server network, and deletes a redundant message among said pieces of data while retaining another message identical to the redundant message.

8. The system according to claim 6, wherein the router controller that determines whether an amount of data on the server network is greater than a prescribed threshold, and wherein the data deletion by the processor is performed when said amount of data is greater than the threshold.

9. The system according to claim 6, wherein the processor deletes anonymous data containing no sender address.

10. The system according to claim 6, wherein the router controller detects a data transfer rate on the external network, and wherein response data sent from the server toward the client is thinned out when the data transfer rate is reduced.

11. A hardware recording medium carrying a computer program for a communications system including: an external network connected to a client; a server network connected to a server; a router connecting the external network and the server network to each other; a processor connected to the router for receiving data from the router and for storing the data in a storage buffer; and a router controller connected to the server network and the router; the program executing:
causing the router controller to check whether data congestion is likely to occur in the server network;
causing the router controller to instruct transmission of the data from the client to the server network via the external network and the router when the router controller determines that data congestion is not likely to occur in the server network;

causing the processor to store, in the storage buffer, the data sent from the client via the external network and the router before transmitting the data to the server network when the router controller determines that data congestion is likely to occur in the server network;

causing the processor to delete a portion of the stored data from the storage buffer when the stored data meets a delete condition; and causing the processor to transmit a non-deleted portion of the stored data to the server network via the same router as used for transmitting the data from the client to the server network when the router controller determines that data congestion is not likely to occur in the server network.

12. The hardware recording medium according to claim 11, wherein the program further executes determining whether the stored data contains a redundant message, and wherein the redundant message is deleted by the processor while another message identical to the redundant message is retained.

13. The hardware recording medium according to claim 11, wherein the program further executes determining whether an amount of data on the server network is greater than a prescribed threshold, and wherein the data meeting the delete condition is deleted by the processor when said amount of data is greater than the threshold.

14. The hardware recording medium according to claim 11, wherein anonymous data containing no sender address is deleted by the processor.

15. The hardware recording medium according to claim 11, wherein the program further executes: detecting a data transfer rate on the external network; and thinning out, when the data transfer rate is reduced, response data sent from the server toward the client.

* * * * *